(12) United States Patent
Enns

(10) Patent No.: US 9,235,261 B2
(45) Date of Patent: Jan. 12, 2016

(54) TRI-AXIS FOOT CONTROLLER

(71) Applicant: Richard B. Enns, Spencerville (CA)

(72) Inventor: Richard B. Enns, Spencerville (CA)

( * ) Notice: Subject to any disclaimer, the term of this patent is extended or adjusted under 35 U.S.C. 154(b) by 208 days.

(21) Appl. No.: 13/845,896

(22) Filed: Mar. 18, 2013

(65) Prior Publication Data

US 2014/0267195 A1    Sep. 18, 2014

Related U.S. Application Data

(63) Continuation-in-part of application No. 12/447,321, filed as application No. PCT/CA2007/001924 on Oct. 30, 2007, now abandoned.

(30) Foreign Application Priority Data

Oct. 30, 2006  (CA) ..................................... 2566082

(51) Int. Cl.
 *G06F 3/01* (2006.01)
 *G06F 3/033* (2013.01)
(52) U.S. Cl.
 CPC .............. *G06F 3/011* (2013.01); *G06F 3/0334* (2013.01)

(58) Field of Classification Search
 CPC .......... G06F 3/01; G06F 3/0334; G06F 3/011
 USPC ................................................... 345/156, 184
 See application file for complete search history.

(56) References Cited

U.S. PATENT DOCUMENTS

| | | | |
|---|---|---|---|
| 2,704,457 A * | 3/1955 | Gabrielson | 74/5.6 R |
| 5,003,828 A * | 4/1991 | van den Burg | 73/861.33 |
| 5,329,276 A * | 7/1994 | Hirabayashi | 340/870.31 |
| 5,552,807 A * | 9/1996 | Hayes et al. | 345/156 |
| 6,689,947 B2 * | 2/2004 | Ludwig | 84/721 |
| 2002/0007265 A1 * | 1/2002 | Yamada | 704/3 |
| 2003/0214483 A1 * | 11/2003 | Hammer et al. | 345/163 |

* cited by examiner

*Primary Examiner* — Mark Regn
(74) *Attorney, Agent, or Firm* — Equinox IP

(57) ABSTRACT

A novel control device for a personal computer which is manipulated by a user's feet. The control device is intuitively manipulated by application of the appropriate pressure to the control device via two pedals for the user's feet. At any one time, the control device may be manipulated such that the control device moves in three distinct directions: the device pivots forwards or backwards, rotates left or right, and dips to the left or to the right. For each movement in a distinct direction, the control device generates an input for a personal computer.

15 Claims, 11 Drawing Sheets

TRI-AXIS FOOT CONTROLLER

CROSS-REFERENCE TO RELATED PATENT APPLICATIONS

The present application is a Continuation-In-Part of U.S. application Ser. No. 12/447,321 filed on Apr. 27, 2009, now abandoned, and that was a U.S. national stage application under 35 U.S.C. §371 of PCT Application No. PCT/CA2007/001924, filed Oct. 30, 2007, the entirety of both of which are incorporated herein by reference.

FIELD OF THE INVENTION

The present invention relates generally to improvements in user interface control devices for personal computers and, more particularly, relates to a new and improved control device wherein a user can control a computer by manipulating foot pedals.

BACKGROUND OF THE INVENTION

A foot pedal is known as a conventional manipulating member which is operated by a user's foot. A foot pedal is operable in the push-in direction. A device, such as a personal computer, is designed or programmed to carry out a specified operation according to the detected push-in amount of the pedal. In the field of user interface devices for computer game applications, it has been a practice to employ foot pedals as input devices particularly for driving and flight control computer games.

A typical computer game will assign one or more different inputs to a corresponding action within the game. As computer games become more involved and complex, more inputs are required to control the actions within the game. Often players must rely on their keyboards and inconvenient or awkward key layouts to provide the necessary inputs. The repetitive nature of key inputs required by video games amplifies the discomfort experienced from using key layouts not adjusted for the hand ergonomics of an individual game player. Further, it is often not intuitive for a game player to press a key in order to effect game actions, for example, to rotate a virtual soldier surveying a battlefield or to cause a virtual plane to turn in flight.

The use of prior art foot devices has alleviated some of these problems. However, a drawback of the conventional foot pedal is the fact that the foot pedal has only one degree of freedom, namely in the push-in direction. This limits the number of inputs that the foot pedal can generate to control the actions of a computer game and a player using the foot pedal remains largely dependent on a computer keyboard or joystick.

There are foot control devices in the art which expand the functionality of conventional foot controllers. U.S. Pat. No. 5,583,407 discloses a foot pedal which produces three inputs. The pedal generates input based on forward and backward movement in a horizontal plane, pivotal movement and rotational movement around a vertical axis.

U.S. Pat. No. 5,552,807 discloses a foot pedal assembly with two pedals. The assembly generates three inputs for a computer based on independent pivoting of the pedals and the relative position of the pedals in a horizontal plane.

The above mentioned patents fail to provide an intuitive control interface for a user whereby the user can generate input for a computer by effecting roll, yaw and pitch rotation on a single device.

Accordingly, there is a need for an improved tri-axis foot controller device.

SUMMARY OF THE INVENTION

It is therefore a general object of the present invention to provide a tri-axis foot controller device.

To overcome the above problems, there is described herein a novel control device for a personal computer wherein the control device generates input for a personal computer based on manipulation of the control device. The control device, similarly to a computer joystick, can be moved with three degrees of freedom, i.e. the device pivots forwards or backwards (pitches), rotates left or right (yaws), and dips to the left or to the right (rolls). The control device is operable by a user's feet and can communicate with a personal computer or game console through a USB connection. Accordingly, the control device may be used in conjunction with a keyboard and mouse without adversely affecting the use of the keyboard or mouse.

The control device is manipulated by application of the appropriate pressure to the control device. At any one time, the control device may be manipulated, as a feet-controlled joystick, such that the control device moves in three distinct directions: the control device pitches, rolls and yaws. For each movement in a distinct direction, the control device generates an input for a personal computer. In one embodiment of the invention, the control device comprises two pedals and the pedals are rotatable around one axis or simultaneously around two or three orthogonal axes.

An advantage of the present invention is that the two pedals of the control device are virtually a same plate, and are located on either side of the rotatable members of the three axis motion. This renders the control of the control device totally intuitive and easy for the user, when using his/her two feet. Accordingly, both feet typically work one with the other when controlling the pitch and yaw motions, and one against the other when controlling the roll motion. Generally, both user's feet are permanently supported by the control device a whole game duration played on the computer (including idle time), since the device is made comfortable for the seated user, as a substitute for the floor.

The control device is capable of simultaneously generating three or more inputs for a personal computer. One or more personal computer functions may be assigned to each of the inputs generated by the control device. The function or functions may be configurable by software installed on the computer and selected based upon any criteria. Along these lines, functions may be assigned to optimize game play, productivity or convenience. The function or functions assigned to a particular input may be changed as desired.

According to an aspect of the present invention, there is provided a control device actuatable by a user's feet for use with a computer, the control device comprising:
a stationary base assembly;
three rotatable members comprising:
a first rotatable member mounted on the top of said base assembly and rotatable about a first axis;
a second rotatable member mounted on said first rotatable member and rotatable about a second axis perpendicular to said first axis;
a third rotatable member mounted on said second rotatable member and rotatable about a third axis perpendicular to said first and second axes, said third rotatable member having a shaft member substantially parallel to the third axis and mounted on said second rotatable member, said third rotatable member having two pedals mounted on said shaft member on either side of said second rotatable member; and detector means operable to detect respective rotation of said three rotatable members, and communicating an input or inputs to the computer based on the detected respective rotation, the computer being responsive to said input or inputs to execute one or more functions correlating to said respective rotation.

Conveniently, each pedal is fixedly attached to the shaft member, substantially at a longitudinal midpoint of the pedal.

In one embodiment of the invention, the control device comprises a pedal assembly with two pedals and three rotatable members, each member rotatable around an axis in a different dimension, i.e., the members rotate around axes in the x, y and z dimensions. The control device is manipulated when a user applies the appropriate pressure with his feet to the pedals of the pedal assembly. At any one time, the control device may be manipulated such that the pedals of the control device move in three distinct directions. For each movement in a distinct direction, one of the three rotatable members is caused to rotate. Detector means are positioned to detect rotation of the rotatable members. When the detector means detects rotation, it generates an electrical signal which the control device associates with a particular input or inputs for a computer. The input or inputs are then communicated to a computer.

According to the present invention then, there is provided a control device actuated by a user's feet for use with a computer, wherein said control device is movable in one distinct rotational direction or simultaneously in two or three distinct rotational directions, said control device producing a respective signal for each movement of said control device in a distinct direction, and means responsive to each said respective signal to command the computer to execute one or more functions associated with that signal.

According to another aspect of the present invention then, there is also provided a control device for use with a computer comprising two pedals, said pedals being rotatable in concert around one axis or simultaneously around up to three orthogonal axes, and wherein said control device communicates an input or inputs to the computer based on said rotation of said pedals, the computer being responsive to said input or inputs to execute one or more functions correlating to said rotation.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE INVENTION

With reference to the annexed drawings the preferred embodiment of the present invention will be herein described for indicative purposes and by no means as of limitation.

Figure 1:
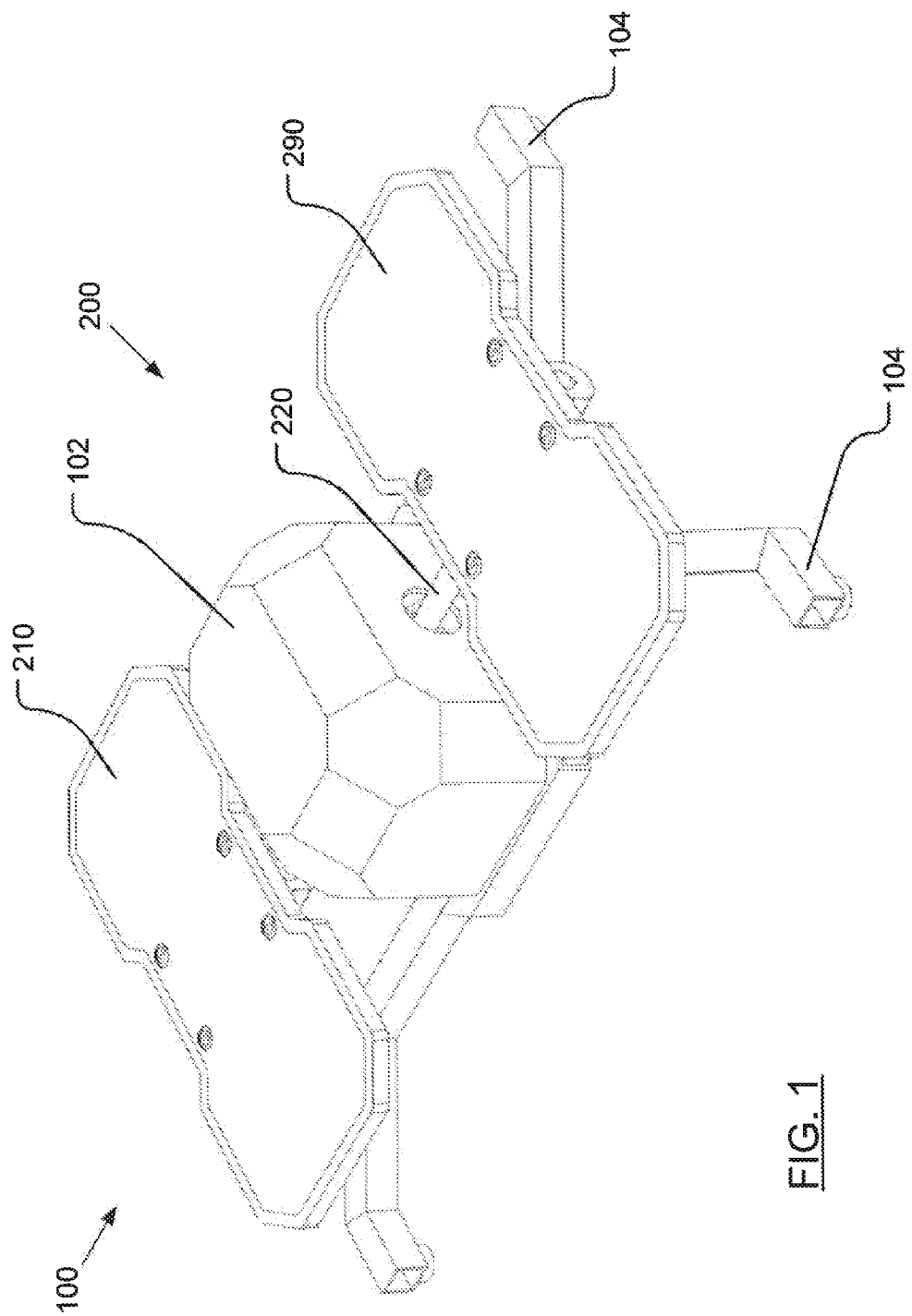
FIG. 1 is a perspective view of a control device according to an embodiment of the invention.
Figure 2:
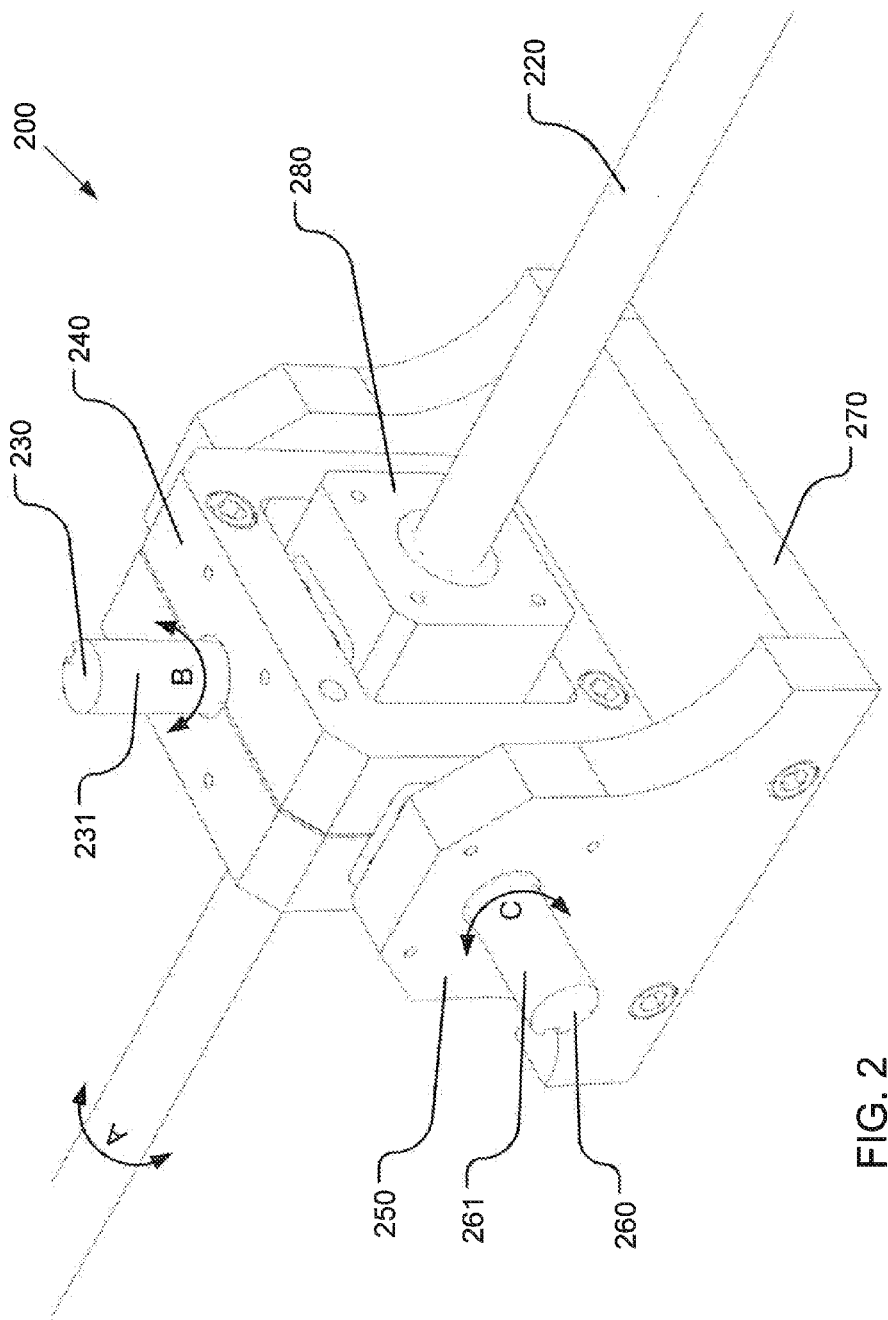
FIG. 2 is an enlarged perspective view of the pedal assembly of the control device of FIG. 1.

With reference to FIGS. 1 and 2, the control device 100 of the present invention generally comprises a pedal assembly 200. Pedal assembly comprises two foot pedals 210, 290; a base assembly comprising third housing 250 and base plate 270; and three rotatable members comprising first shaft 220, second shaft 230 and first housing 280, and third shaft 260 and second housing 240. The pedal assembly may be partially enclosed by casing 102. The pedal assembly may also be provided with support legs 104.

First pedal 210 and second pedal 290 of pedal assembly 200 are fixedly attached proximate to opposite ends of first shaft 220. First and second pedals are attached to first shaft 220 at their longitudinal midpoint. In alternate embodiments of the control device 100, first and second pedals are adjustably attached to the first shaft so that their position along the length of first shaft can be adjusted to maximize the comfort of a user. Further, it will be appreciated that first and second pedals can include slippers or stirrups capable of accommodating the user's feet for a more positive engagement of the pedals. Proximate to its longitudinal midpoint, first shaft 220 is rotatably seated or journalled into first housing 280 such that pedals 210, 290, being on either side thereof, and the first shaft can rotate together relative to first housing 220 in both directions indicated by arrow A, such that the two pedals 210, 290 are as if they were virtually on a same plate.

Second shaft 230 consists of first and second, non-contiguous segments. Both segments lie on the same vertical axis, which is perpendicular to the longitudinal axis of first shaft 220. The first segment 231 of second shaft 230 extends upwardly from first housing 280 and the second segment (not shown) of second shaft extends downwardly from the first housing. Both segments are fixed attached to first housing 280 and are rotatably seated or journalled in or through the respective upper and lower surfaces of second housing 240. Accordingly, first housing 280 and both segments of second shaft 230 rotate together relative to second housing 240 in both directions indicated by arrow B.

Third shaft 260 is structurally similar to second shaft 230. Third shaft 260 consists of first non-contiguous segment 261 and second non-contiguous segment (not shown). Both segments lie on the same horizontal axis, which is perpendicular to the axes of first shaft 220 and second shaft 230. First segment 261 of the third shaft extends from one side of second housing 240 and second segment of third shaft 260 extends from the opposite side of the second housing. Both segments are fixedly attached to second housing 240 and are rotatably seated in or journalled through the respective end surfaces of third housing 250 so that the second housing and third shaft 260 rotate together relative to third housing 250 in both directions indicated by arrow C. The base or supporting part of the pedal assembly comprises base plate 270 and third housing 250. Third housing 250 is fixedly attached to base plate 270 and these two components remain stationary during the manipulation of the pedal assembly 200.

Applying, rather intuitively, the appropriate pressure to the pedals 210, 290 can effect rotation of each of the shafts 220, 230, 260 around their longitudinal axes, individually or in concert. Applying downward pressure to the front or rear half of a/both pedal(s) causes the pedals to pivot and first shaft 220 to rotate for pitch control. Pushing one pedal forward or backward in a plane parallel to base plate 270, and the other in the opposite direction in the same plane, causes second shaft 230 to rotate for yaw control. Applying downward pressure evenly to the length of one pedal, while retaining (for control) the even upward movement of the other pedal, causes third shaft 260 to rotate for roll control.

Pedal assembly 200 is equipped with detector means 300 operable to detect rotation of each of the shafts as will now be described. The examples of detector means described below are not meant to limit the control device 100, and any detector means operable to detect rotation of each of the shafts could replace the below examples.

With reference to FIGS. 3 to 9, in one embodiment of the control device 100, each shaft of pedal assembly 200 may be equipped with its own detector means 300 for detecting movement of each shaft. Each detector means 300 comprises a bottom plate 330, a top plate 380, a rotation limiter 370 (FIG. 5), an actuation collar 360, and two tension springs, bottom tension spring 390, and top tension spring 392 seen most easily in FIG. 5. Best shown in FIG. 5, the bottom plate 330 has rotation stops 332, 334, spring attachment means 336, and an orthogonally extending flange 338.

The rotation limiter 370 comprises a circular disk having a shaft-receiving channel or aperture 371 and four stop channels or apertures 376 extending therethrough, and spring attachment means 372, 374.

Figure 4:
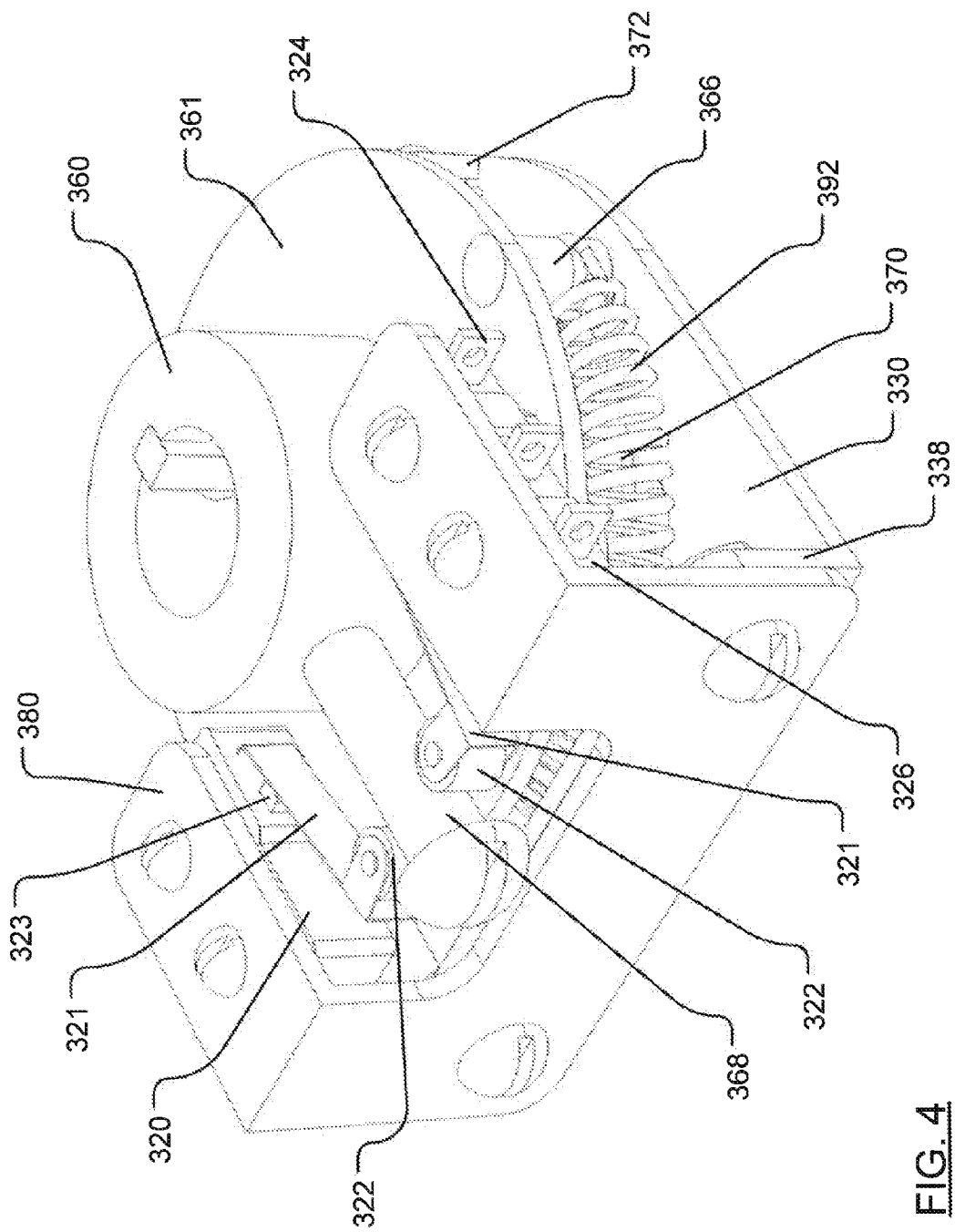
FIG. 4 is an enlarged perspective view of one of the detector means of FIG. 3.

With reference to FIG. 4, actuation collar 360 comprises an actuation arm 368 or a light emitting diode ("LED") 369 (FIG. 8), and a collar flange 361 having rotation stops 362, 364 (FIG. 6) and spring attachment means 366 extending from the lower surface of the collar flange.

Top plate 380 support sensor means 310 (FIG. 3) for detecting movement. Various sensor means 310 can be used, for example, optical sensors, mechanical switches, potentiometer or resistance sensors, speed transducers and accelerometers, strain gauges and linear displacement sensors.

Figure 3:
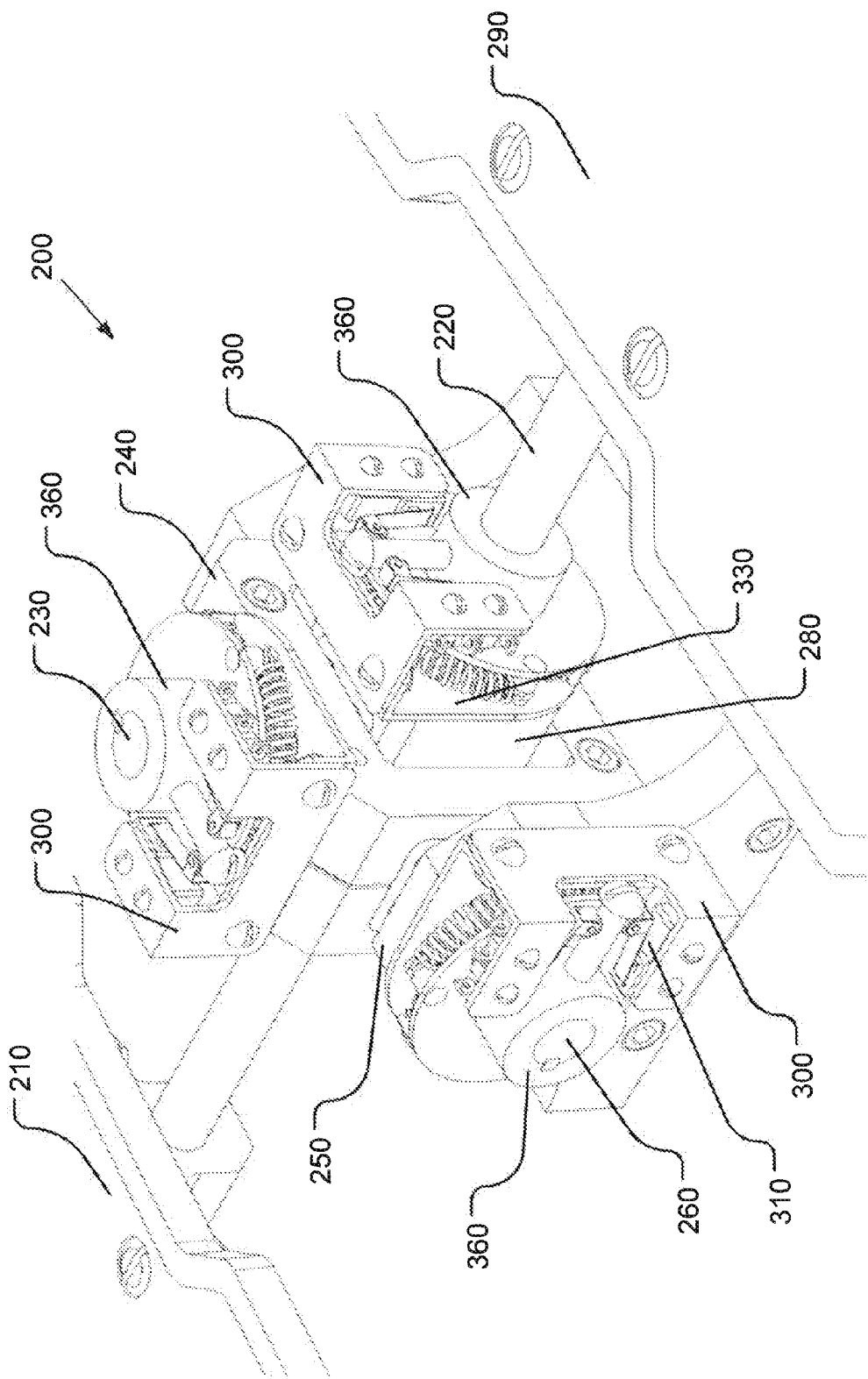
FIG. 3 is an enlarged perspective view of the pedal assembly and detector means of the control device of FIG. 1.

In FIG. 3, detector means 300 is associated with first shaft 220 as follows. Bottom plate 330 is fixedly attached to an interior or exterior vertical surface of first housing 280 so that first shaft 220, which extends through the first housing, also extends through a circular hole (not shown) in the centre of the bottom plate.

Figure 5:
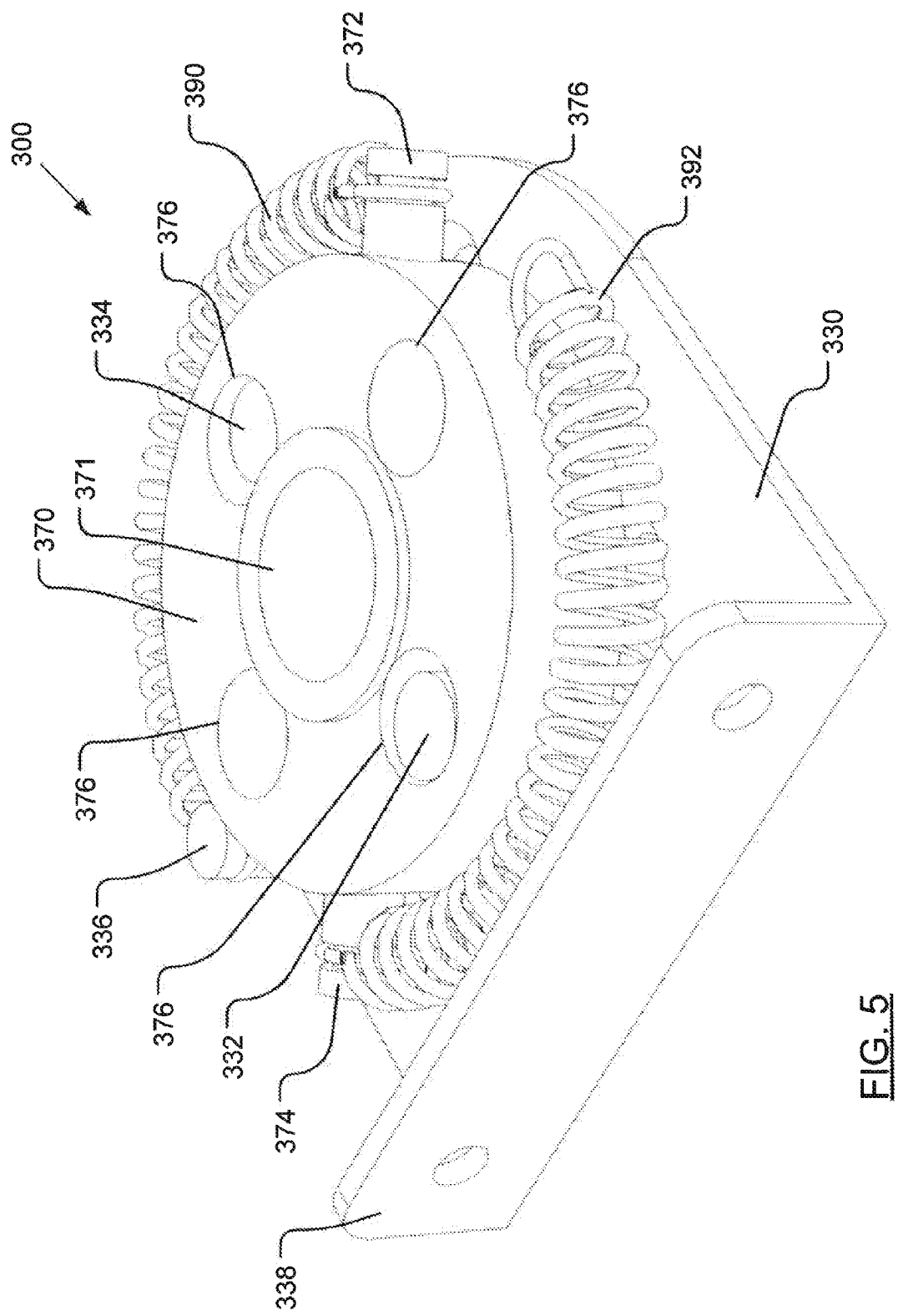
FIG. 5 is a perspective view of the rotation limiter of the detector means of FIG. 4.

Best shown in FIG. 5, the rotation limiter 370 is positioned adjacent bottom plate 330 such that rotation stops 332, 334 are received in two of the stop channels 376 and aperture 371 is aligned with the circular hole in the bottom plate to receive first shaft 220 therethrough. Bottom tension spring 390 is attached at one end to spring attachment means 336 of the bottom plate and at the other end to spring attachment means 372 of the rotation limiter.

Figure 6:
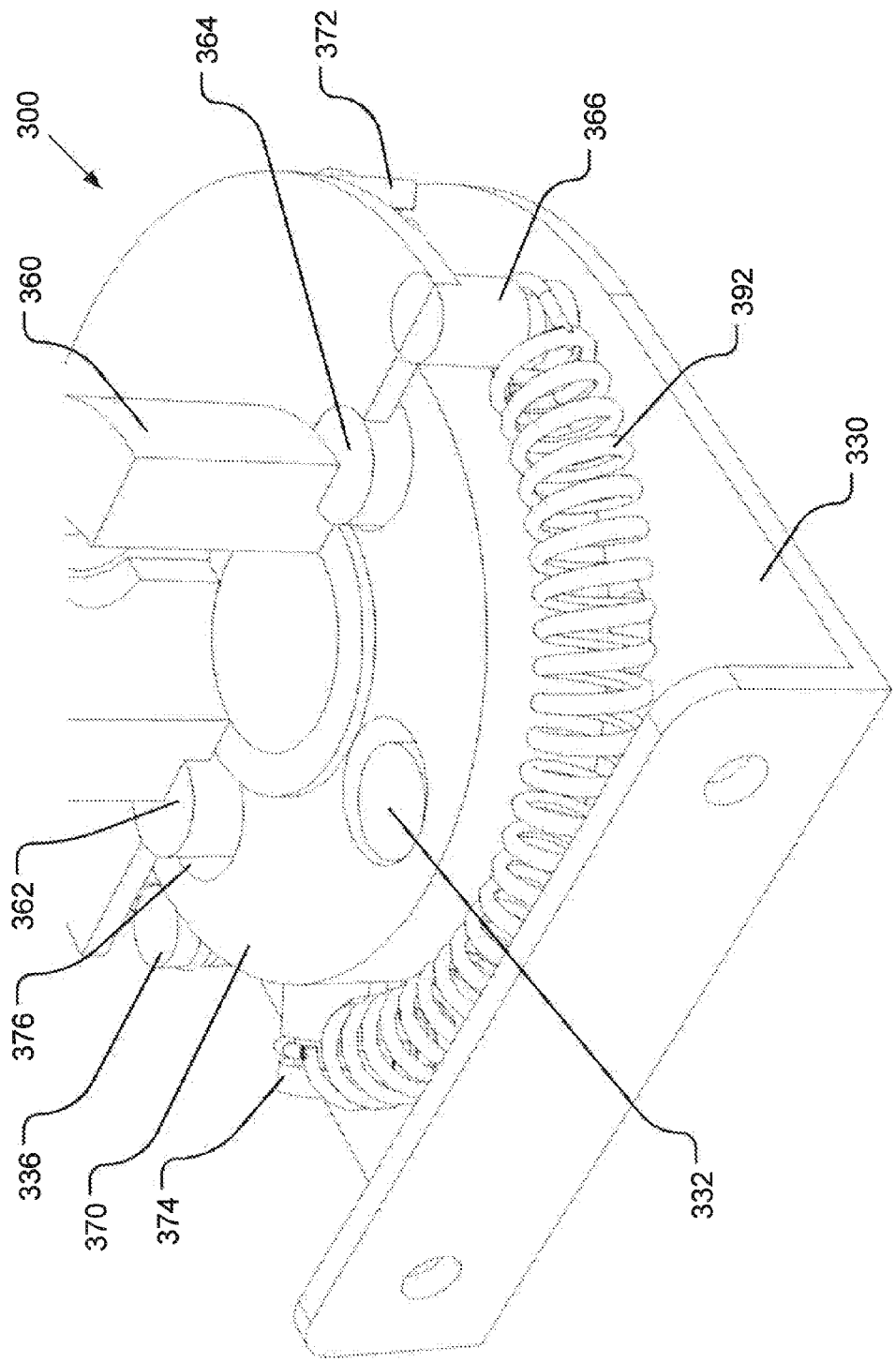
FIG. 6 is a partial cross-sectional view of the detector means of FIG. 4.

Best shown in FIG. 6, actuation collar 360 is fixedly attached, such as by means of a spline 365, to first shaft 220 adjacent the rotation limiter 370 such that rotation stops 362 and 364 are received in stop channels 376. Actuation arm 368 extends from one side of the collar. Top tension spring 392 is attached at one end to spring attachment means 366 of the actuation collar and at the other end to spring attachment means 374 of the rotation limiter.

With reference to FIG. 4, the top plate 380 is fixedly attached to flange 338 of bottom plate 330 such as by means of threaded fasteners as shown. The sensor means 310 of the top plate comprise opposing switches, a counterclockwise switch 326 and a clockwise switch 320. The top plate positions the opposing switches on either side of actuation arm 368. Switches 320, 326 may comprise mechanical switches or optical switches. In the embodiment shown in FIG. 4, the switches are mechanical switches each comprising a bias arm 321 having a roller 322, a switch contact 323, and wiring brackets 324. The bias arms 321 bias the rollers 322 against the actuation arm 368. Switches 320 and 326 are connected to the top plate 380 such as by means of threaded fasteners 327.

In an alternate embodiment, bottom plate 330 can be eliminated, using instead a surface of the first housing 280 to perform the function of the bottom plate.

The operation of detector means 300 will now be described with reference to FIGS. 3 to 6. Tension springs 390, 392 act as a neutral stop, resisting rotation of actuation collar 360 in either direction around the longitudinal axis of first shaft 220. In other words, tension springs 390, 392 bias actuation collar 360 and first shaft 220, which is fixedly attached to the collar, into a neutral default or resting orientation. In this position, rotation stops 332, 334, 362, 364 are each at the clockwise end of their respective stop channels 376. When a rotational force sufficient to stretch one of the tension springs 390, 392 is applied to first shaft 220, the shaft rotates.

When the first shaft is rotated counterclockwise, the actuation collar 360 also rotates and the top tension spring 392 is stretched. The rotation stops 332, 334 of the bottom plate keep the rotation limiter 370 stationary while the collar rotates.

The actuation collar can continue to rotate in a counterclockwise direction until the rotation stops 362, 364 come into contact with the counterclockwise end of their respective stop channels 376 which prevents further rotation. When rotation stops 362, 364 contact the counterclockwise end of their respective stop channels 376, simultaneously, the actuation arm 368 pushes against counterclockwise switch 326 as follows. The actuation arm pushes the bias roller 322 and bias arm 321 of counterclockwise switch against switch contact 323, activating the counterclockwise switch. Actuation collar 360 will remain in this position, keeping the switch active, as long as a rotational force continues to be applied to first shaft 220. When the force is removed, the actuation collar, in effect, springs back. The top tension spring 392 rotates the actuation collar clockwise, moving the actuation arm away from the activated switch, which then opens or deactivates. Actuation collar 360 rotates back into its default position.

When the first shaft is rotated clockwise from its default position, the actuation collar 360 also rotates. The rotation stops 362, 364 of the actuation collar, at the clockwise end of their respective stop channels 376, push the rotation limiter 370 in a clockwise rotation. As the rotation limiter rotates, the bottom tension spring 390 is stretched. The actuation collar can continue to rotate in a clockwise direction, along with the rotation limiter 370, until the rotation stops 332, 334 of the base plate come into contact with the counterclockwise end of their respective stop channels 376 which prevents further rotation. When the rotation stops 332, 334 contact the counterclockwise end of their respective stop channels 376, simultaneously, the actuation arm 368 pushes against the clockwise switch 320, activating the switch. Actuation collar 360 will remain in this position, keeping the switch active, as long as a rotational force continues to be applied to first shaft 220. When the force is removed, the bottom tension spring 390 rotates the actuation collar counterclockwise, moving the actuation arm away from the activated switch, which then opens or deactivates. Actuation collar 360 rotates back into its default position.

Figure 10:
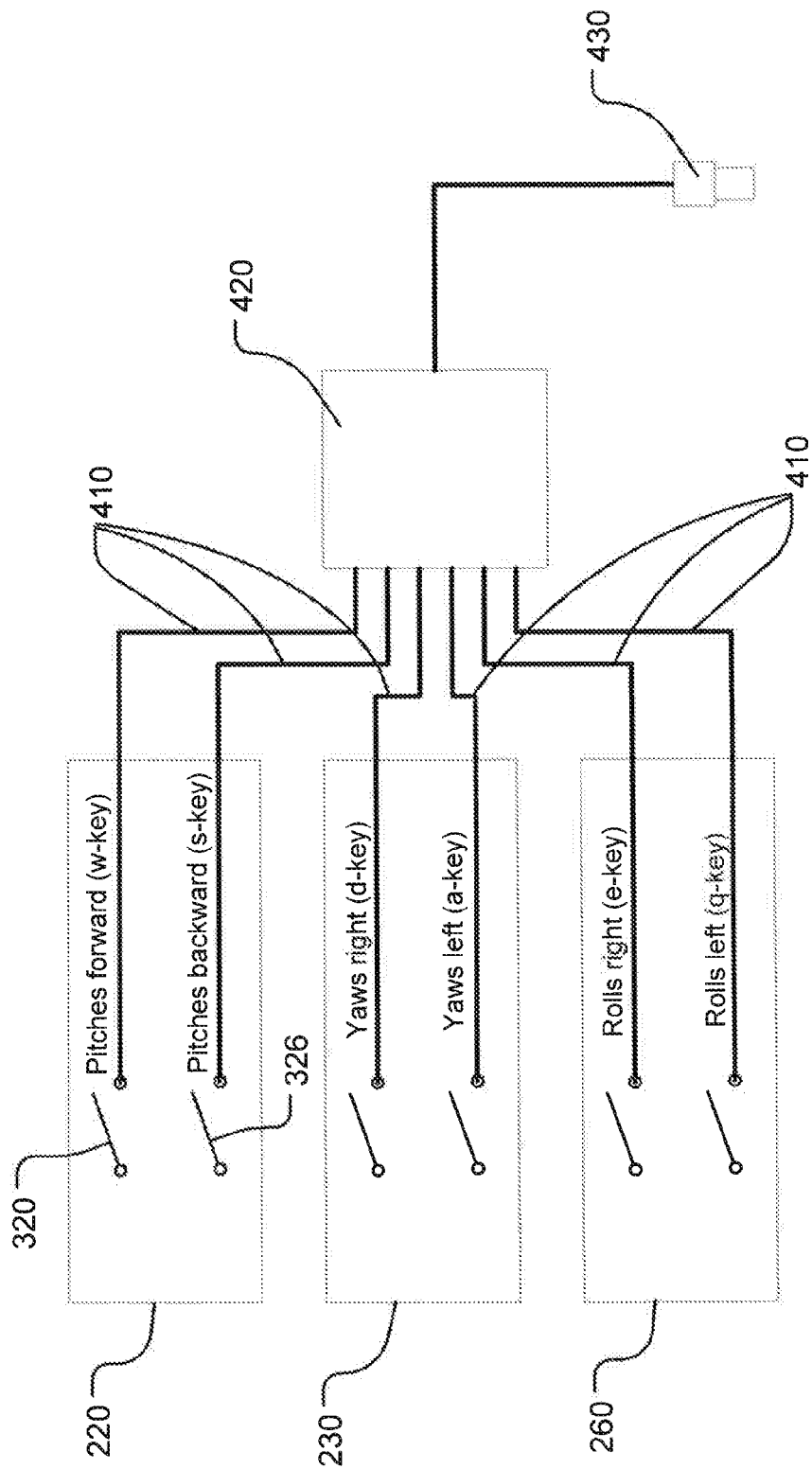
FIG. 10 is a schematic view of the wiring of the control device of the present invention.

When either switch 320, 326 of pedal assembly 200 is activated, control device 100 communicates an input signal to a personal computer. With reference to FIG. 10, in one embodiment of the control device 100, each shaft 220, 230, 260 is associated with its own pair of switches 320, 326, for a total of six switches in pedal assembly 200. When one of the switches is activated, the switch generates an electric signal which is transmitted to a USB keyboard controller chip 420 via one of dedicated wires 410. USB keyboard controller chip 420 may be connected to the personal computer using a USB Type-A plug 430. In the present embodiment, controller chip 420 associates electrical signals received from each of dedicated wires 410 with particular keyboard commands. When controller chip 420 receives a signal, it communicates the associated keyboard command in an input signal to the computer. For example, when clockwise switch 320 of first shaft 220 is activated, an electric signal is generated and received by controller chip 420 and the controller chip tells the connected computer to execute a w-key command. In other words, the computer is made to behave as if the w-key of the computer's keyboard had been pressed.

Figure 7:
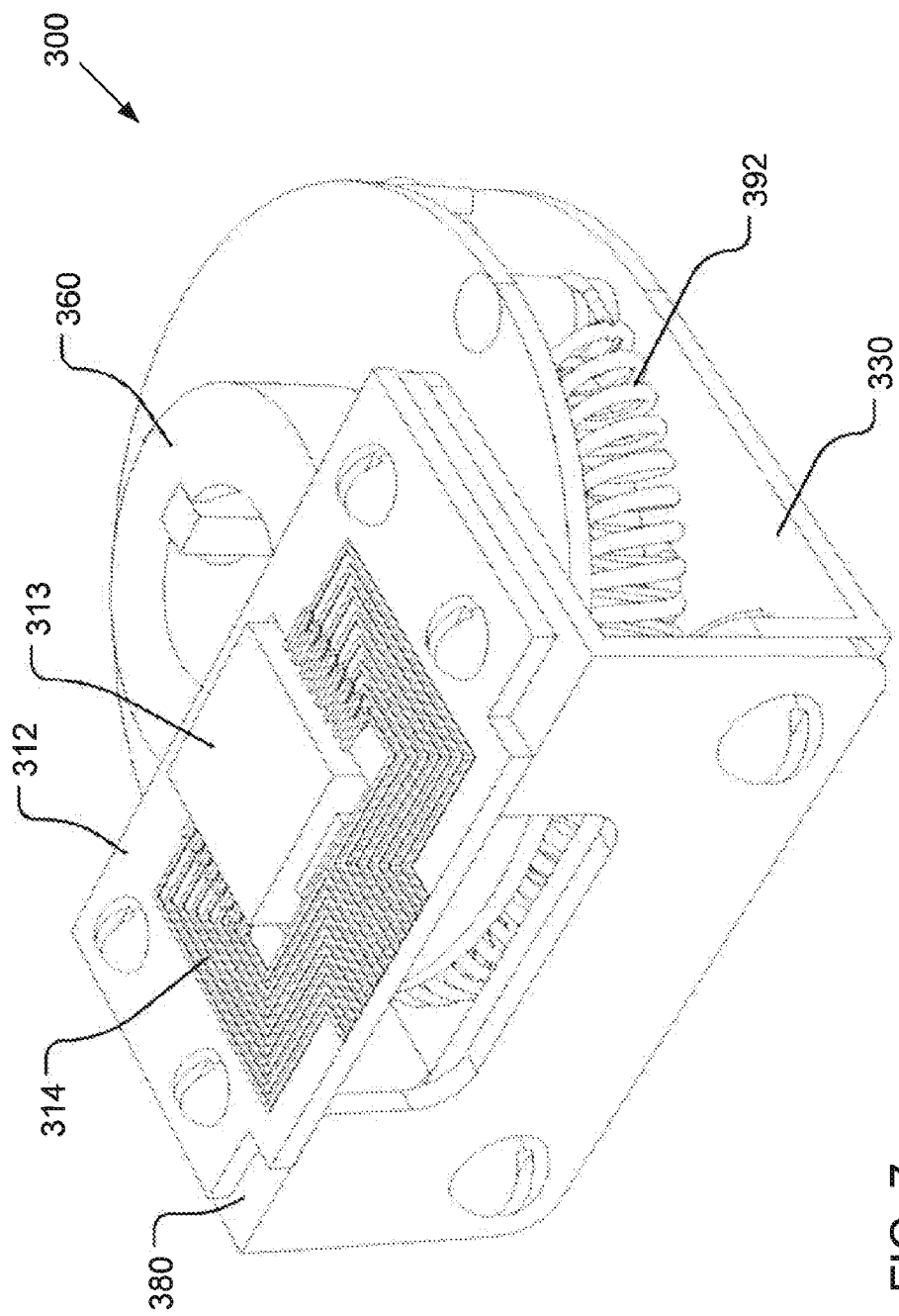
FIG. 7 is an enlarged perspective view of a detector means according to another embodiment of the invention.
Figure 8:
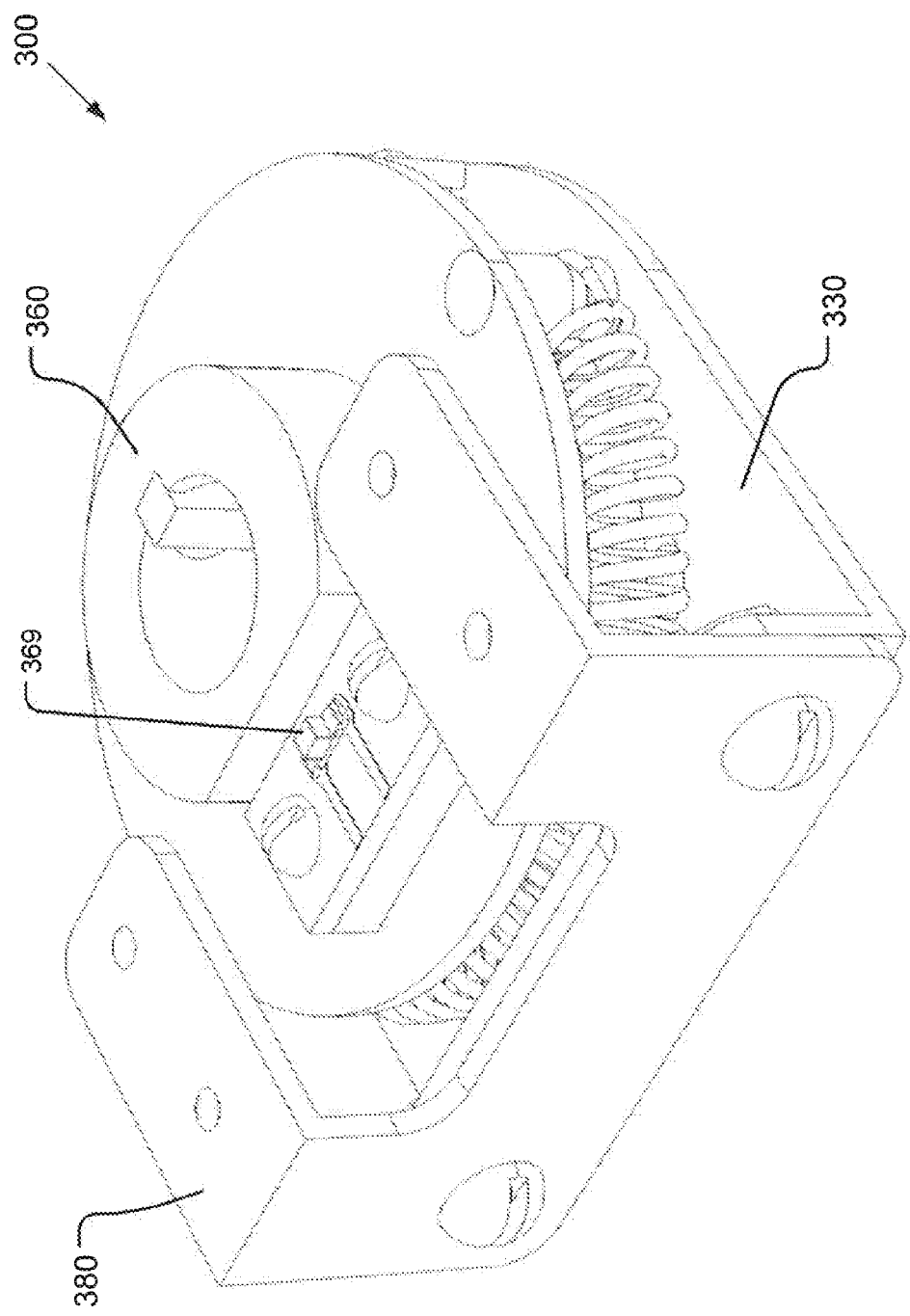
FIG. 8 is a perspective view of the actuation collar of the detector means of FIG. 7.
Figure 9:
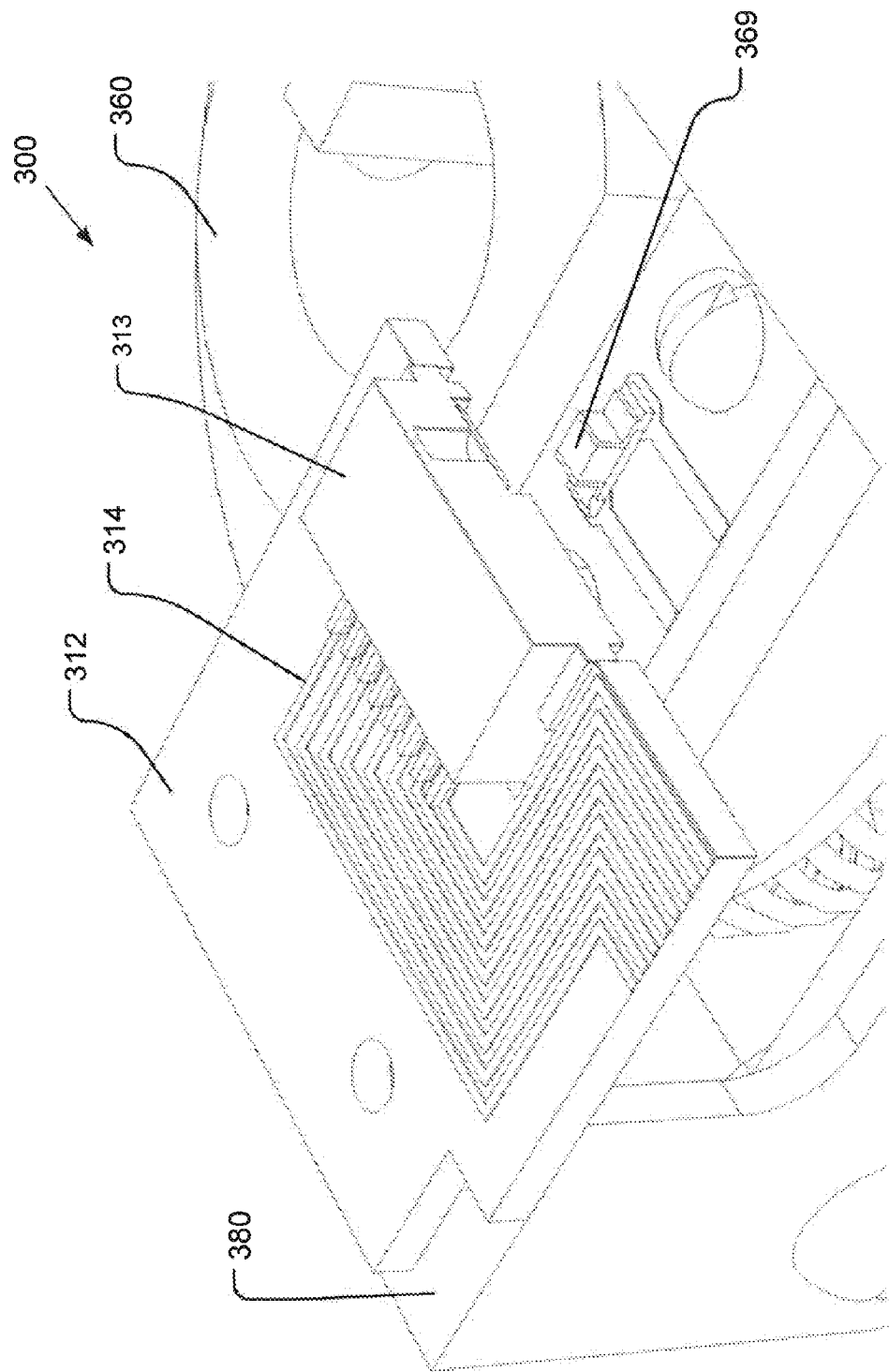
FIG. 9 is a partial cross-sectional view of the detector means of FIG. 7.

In another embodiment of control device 100, the sensor means 310 of the top plate 380 comprise an optical sensor 312. With reference to FIGS. 7 to 9, in this embodiment the actuation arm 368 of actuation collar 360 is replaced with an LED 369. The LED 369 is connected to a power source (not shown). The optical sensor 312 comprises a LED position sensor 313. The top plate positions the optical sensor 312 above the LED 369 such that light emitted by the LED will be received by the LED position sensor 313.

The operation of detector means 300 wherein the sensor means 310 comprise an optical sensor 312 will now be described with reference to FIGS. 7 to 9. When the first shaft is rotated counterclockwise or clockwise, the actuation collar 360 also rotates. Rotation limiter 370 and tension springs 390, 392 operate as described above with respect to the embodiment of control device 100 shown in FIGS. 4 to 6. The LED 369 rotates with the actuation collar and continuously emits a light beam parallel to the first shaft 220. The LED position sensor 313, which is stationary relative to the LED 369, receives the light emitted by the LED. The LED position sensor 313 generates an electrical signal based on the part of the sensor that receives the light. This electrical signal is transmitted to a sensor controller chip (not shown) via sensor circuitry 314. The sensor controller chip may be connected to a personal computer using a USB Type-A plug. In the present embodiment of the control device 100, the sensor controller chip determines progressive movement of the first shaft 220, counterclockwise or clockwise, based on changes in the electrical signals received over time. The sensor controller chip communicates information regarding the progressive movement of the first shaft in an input signal to the personal computer, wherein a software driver may associate different computer commands with different movements of the first shaft, according to a user's preference.

Those skilled in art will appreciate that rotation limiter 370 may comprise other mechanisms not explicitly shown in FIGS. 3 to 9. The rotation limiter 370 may, for example, be eliminated by incorporating elements of the rotation limiter into the actuation collar and the base plate. Other examples will be apparent to those skilled in the art.

Those skilled in art will appreciate that detector means 300 may comprise other mechanisms not explicitly shown in FIGS. 3 to 9. Detector means 300 may, for example, comprise a single optical sensor adapted to detect the movement of each of the shafts 220, 230, 260. Other examples will be apparent to those skilled in the art.

Those skilled in art will further appreciate that the three rotatable members of control device 100 may be replaced with other mechanisms, not explicitly described, which enable the control device to move in three distinct directions. The rotatable members may, for example, be replaced with a ball and socket system, equipped with detector means 300 adapted to detect the movement of the ball and socket. The detector means may, for example, comprise a single optical sensor. Other examples will be apparent to those skilled in the art.

Figure 11:
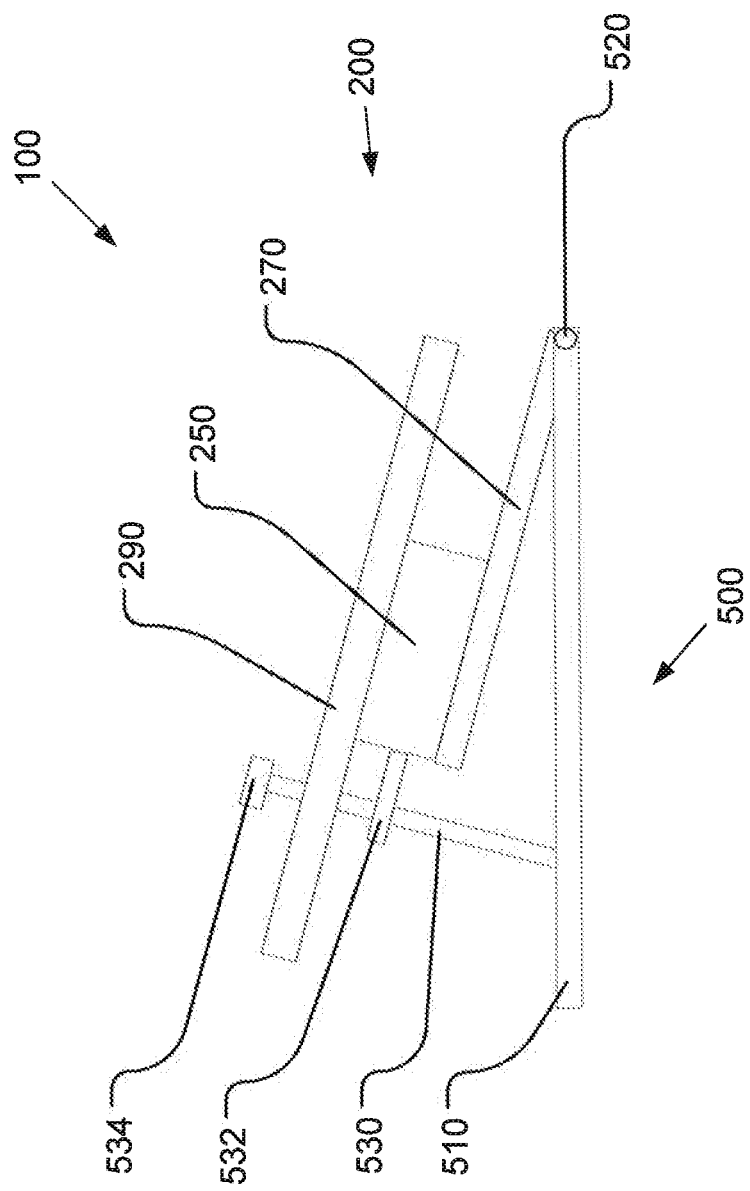
FIG. 11 is a perspective view of a control device having an integrated incline adjustment means according to another embodiment of the invention.

In another embodiment of the control device 100, pedal assembly 200 may have an associated means 500 to adjust the assembly's incline relative to the user's feet. With reference to FIG. 11, the incline adjustor 500 comprises a pedestal 510, a hinge 520 and adjustable lifting means such as a threaded rod 530. One side of base plate 270 is pivotably attached by means of hinge 520 to pedestal 510, so that the base plate can pivot up and down. Threaded rod 530 is journalled through a flange 532 attached an outer surface of housing 250 for example so that the rod's lower end bears against pedestal 510. The rod includes a knob 534 that can be turned in one direction to increase the tilt of the pedal assembly towards the user and in the other direction to tilt it away from the user into a more horizontal position. The incline of the pedal assembly may be adjusted to provide maximum comfort to a user of pedal assembly 200.

In alternate embodiments of the control device, other incline adjusters can be used, such as an adjustable wedge or even a motorized lift.

A description of the operation of control device 100 according to the embodiment described in FIGS. 1 to 6 follows. A user of the control device connects the control device to a personal computer or game console using a USB connection. Next, the user sits down and places his/her feet on pedals 210, 290 of pedal assembly 200. The pedals are initially in their neutral or resting positions. By applying force to the pedals, the user can move the pedals, which move in concert, with three degrees of freedom. For each degree of freedom, the pedal assembly generates an input signal for the personal computer.

With regard to the first degree of freedom, pitch, both pedals can be pivoted simultaneously forwards or simultaneously backwards. The user applies downward pressure with the balls or toes of the feet to effect forward pivoting of the pedals. Similarly, a user applies downward pressure with the heels of the feet to effect a backward pivot. When the pedals pivot forwards or backwards, they rotate (or pitch) around the horizontal axis of shaft 220.

The user pivots the pedals forwards or backwards a predetermined distance until the pedals stop. This coincides with the activation of one of switches 320 or 326 so that the control device commands the connected computer to execute a function or functions associated with either a forward or backward pivot, as the case may be. When the user ceases to apply pressure to the pedals, the pedals return to their neutral position. The pedals, in effect, spring back to their neutral position.

With regard to the second degree of freedom, yaw, one pedal can be moved forward and the other pedal moved backward simultaneously. To effect this movement, the user pushes one foot forwards and/or pulls the other foot backwards. When a pedal is moved forward or backward, it rotates (or yaws) a short distance around the vertical axis of shaft 230.

The user pivots the pedals forwards or backwards a predetermined distance until the pedals stop and the control device commands the connected computer to execute a function or functions associated with either left pedal forward (right pedal backward) or right pedal forward (left pedal backward), as the case may be. When the user ceases to apply pressure to the pedals, the pedals return to their neutral position.

With regard to the third degree of freedom, roll, one pedal can be depressed and the other pedal raised simultaneously. To effect this movement, the user applies downward pressure to one pedal, distributing pressure evenly to the length of the pedal, and allows the other pedal to rise. When a pedal is depressed or raised, it rotates (or rolls) a short distance around the horizontal axis of shaft 260.

The user depresses one of the pedals a predetermined distance until the pedals stop and the control device commands the connected computer to execute a function or functions associated with either a left pedal depression or a right pedal depression, as the case may be. When the user ceases to apply pressure to the pedal, the pedals return to their neutral position.

Although a few embodiments of the present invention have been shown and described, it will be appreciated by those skilled in the art that changes may be made in these embodiments without departing from the principles and spirit of the invention, the scope of which is defined in the claims and their equivalents.

I claim:

1. A control device actuatable by a user's feet for use with a computer, the control device comprising:
    a stationary base assembly;
    three rotatable members comprising:
        a first rotatable member mounted on the top of said base assembly and rotatable about a first axis;
        a second rotatable member mounted on said first rotatable member and rotatable about a second axis perpendicular to said first axis;
        a third rotatable member mounted on said second rotatable member and rotatable about a third axis perpendicular to said first and second axes, said third rotatable member having a shaft member substantially parallel to the third axis and mounted on said second rotatable member, said third rotatable member having two pedals fixedly attached to said shaft member on either side of said second rotatable member wherein said two pedals virtually form a plate; and
    detector means operable to detect respective rotation of said three rotatable members, and communicating an input or inputs to the computer based on the detected respective rotation, the computer being responsive to said input or inputs to execute one or more functions correlating to said respective rotation.

2. The control device of claim 1 wherein said detector means comprise spring means to bias said three rotatable members in respective default positions.

3. The control device of claim 2 wherein said detector means comprise switch means arranged to detect a predetermined amount of clockwise or counterclockwise rotation of said three rotatable member relative to said respective default positions and operable to transmit a signal when rotation is detected.

4. The control device of claim 3 wherein said switch means comprise:
    a first switch means arranged to detect rotation of said first rotatable member;
    a second switch means arranged to detect rotation of said second rotatable member; and
    a third switch means arranged to detect rotation of said third rotatable member.

5. The control device of claim 4 wherein said switch means are optical switches or mechanical switches.

6. The control device of claim 3 further comprising a USB keyboard control chip, said control chip operable to receive said signal, match said signal to said one or more functions, and communicate to the computer through a USB connection said one or more functions in said input or inputs.

7. The control device of claim 3 wherein said one or more functions are configurable.

8. The control device of claim 2 wherein said detector means comprise an optical sensor arranged to detect rotation of said three rotatable members and operable to transmit a signal when rotation is detected.

9. The control device of claim 2 wherein said detector means comprise:
    a first optical sensor arranged to detect rotation of said first rotatable member;
    a second optical sensor arranged to detect rotation of said second rotatable member; and
    a third optical sensor arranged to detect rotation of said third rotatable member;
    wherein said optical sensors are operable to transmit a signal when rotation is detected.

10. The control device of claim 9 further comprising a control chip, said control chip operable to receive said signal, determine progressive movement of said three rotatable members based on said signal, and communicate said progressive movement to the computer in said input or inputs.

11. The control device of claim 10 wherein the computer comprises a software driver for matching said input or inputs to said one or more functions.

12. The control device of claim 1 wherein said pedals include foot receiving members mounted on the top of said pedals.

13. The control device of claim 1 wherein said base assembly comprises an incline adjustment means.

14. The control device of claim 1 wherein each said pedal is fixedly attached to the shaft member, substantially at a longitudinal midpoint of the pedal.

15. The control device of claim 14 wherein each said pedal includes an incline adjustment means.

* * * * *